United States Patent

[11] 3,631,343

[72] Inventor Rolf Schmidhauser
Los Altos, Calif.
[21] Appl. No. 67,417
[22] Filed Aug. 27, 1970
[45] Patented Dec. 28, 1971
[73] Assignee Hewlett-Packard Company
Palo Alto, Calif.

[54] TIME INTERVAL AVERAGING CIRCUIT
3 Claims, 2 Drawing Figs.
[52] U.S. Cl. .................................................... 324/186
[51] Int. Cl. .................................................... G04f 9/00,
G04f 11/06
[50] Field of Search ........................................... 324/186,
187; 328/129; 235/92 T

[56] References Cited
UNITED STATES PATENTS
2,877,413 3/1959 Muehlner ..................... 324/186

Primary Examiner—Alfred E. Smith
Attorney—A. C. Smith

ABSTRACT: A circuit to measure the average time interval that occurs between recurring electrical signals. Independent input channels control the passage of periodic clock pulses through a gate such that only complete clock pulses are passed through the gate. The number of clock pulses that occur during $10^N$ time intervals (where N is an integer) is totalized and displayed.

INVENTOR
ROLF SCHMIDHAUSER

TIME INTERVAL AVERAGING CIRCUIT

BACKGROUND OF THE INVENTION

Certain known techniques for measuring the time interval between two signals include a source of periodic clock pulses which is connected to a gate, commonly called a clock gate. A first signal is used to enable the clock gate and thereby pass clock pulses of known frequency through the gate. A second signal is used to disable the clock gate and thereby inhibit the passage of clock pulses through the gate. The clock gate output is typically connected to the input of a pulse-shaping circuit which provides at its output a single pulse for every complete input pulse. The output of the pulse-shaping circuit is counted and the time interval between the first and second signals is proportional to the number of pulses counted. The shortest time interval that can be resolved with this measurement technique is determined by the period of clock pulses from the source of periodic clock pulses.

Typically, the opening and closing of the clock gate is unsynchronized with the periodic clock pulses and thereby an error of plus or minus one clock period is introduced into the measurement. This error can be greatly reduced and the resolution of the measurement greatly improved such that time intervals shorter than a clock period can be measured by taking the average of a number of time interval measurement.

One disadvantage of known time interval measurement techniques is that the clock gate may be enabled and/or disabled during a periodic clock pulse and the output of the clock gate may be a fraction of a complete clock pulse. The number of pulses produced by pulse-shaping circuits in response to a fraction of a clock pulse cannot be statistically determined and may be zero, one or even two pulses. As the number of time intervals averaged is increased, the number of pulses produced by the pulse-shaping circuits in response to fractions of clock pulses becomes a significant source of error in the measurement.

SUMMARY OF THE INVENTION

The present invention provides a circuit to measure the average time interval that occurs between recurring electrical signals. The number of clock pulses that are passed through a clock gate during $10^N$ time intervals are totalized and displayed. The number N is an integer which may be selected by a switch. The display includes a decimal point that is positioned in response to the number N selected.

The opening and closing of the clock gate of the present invention is synchronized with periodic clock pulses such that only complete clock pulses are passed through the clock gate and thereby significant errors that are caused by the clock gate passing fractions of a clock pulse are eliminated.

DESCRIPTION OF THE PREFERRED EMBODIMENT

Figure 1:
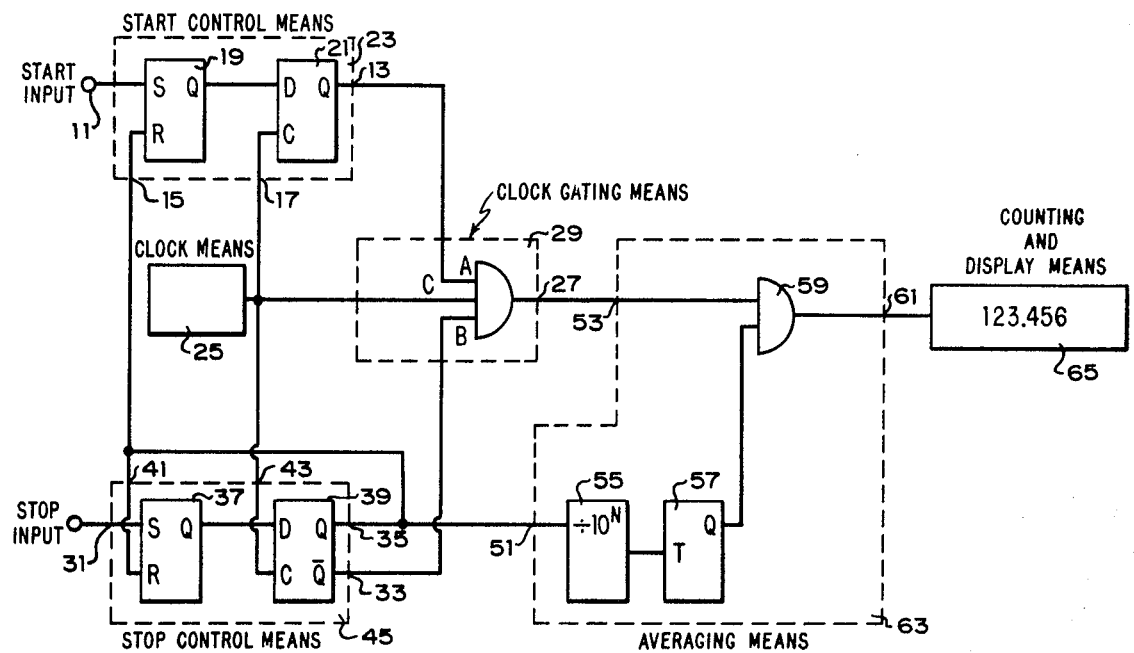
FIG. 1 is a drawing of the preferred embodiment of the invention.

Referring now to FIG. 1 there is shown the time interval averaging circuit. Start control means 23 has a start input 11 connected to the set input of set/reset flip-flop 19. Output Q of flip-flop 19 is connected to the "D" input of a conventional D-type flip-flop 21. A clock means 25 is connected to clock input 17 of start control means 23 to provide clock pulses as shown in FIG. 2a to the clock input of flip-flop 21. A signal appearing at start input 11, as represented in FIG. 2b, causes flip-flop 19 to set. Flip-flop 19 being set prior to the leading edge of a clock pulse appearing at the clock input of flip-flop 21 causes output Q of flip-flop 21 to switch to a true level upon the trailing edge of the clock pulse. Output Q of flip-flop 21 forms output 13 of start control means 23 and FIGS. 2a, 2b and 2d show this output switching upon the trailing edge of a clock pulse applied at input 17 of start control means 23 to a true level in response to a signal applied at input 11 of start control means 23.

Stop control means 45 has a stop input 31 connected to the set side of set/reset flip-flop 37. Output Q of flip-flop 37 is connected to the "D" input of conventional D-type flip-flop 39. Clock means 25 is connected to clock input 43 of stop control means 45 to provide clock pulses as shown in FIG. 2a to the clock input of flip-flop 39. A signal appearing at stop input 31, as represented in FIG. 2c, causes flip-flop 37 to set. Flip-flop 37 being set prior to the leading edge of a clock pulse appearing at the clock input of flip-flop 37 causes output $\overline{Q}$ of flip-flop 39 to attain a false level and output Q of flip-flop 39 to attain a true level upon the trailing edge of the clock pulse as shown in FIGS. 2a, 2c, 2e and 2f. Output $\overline{Q}$ of flip-flop 39 forms output 33 of stop control means 45 and output Q of flip-flop 39 forms output 35 of stop control means 45.

Figure 2:
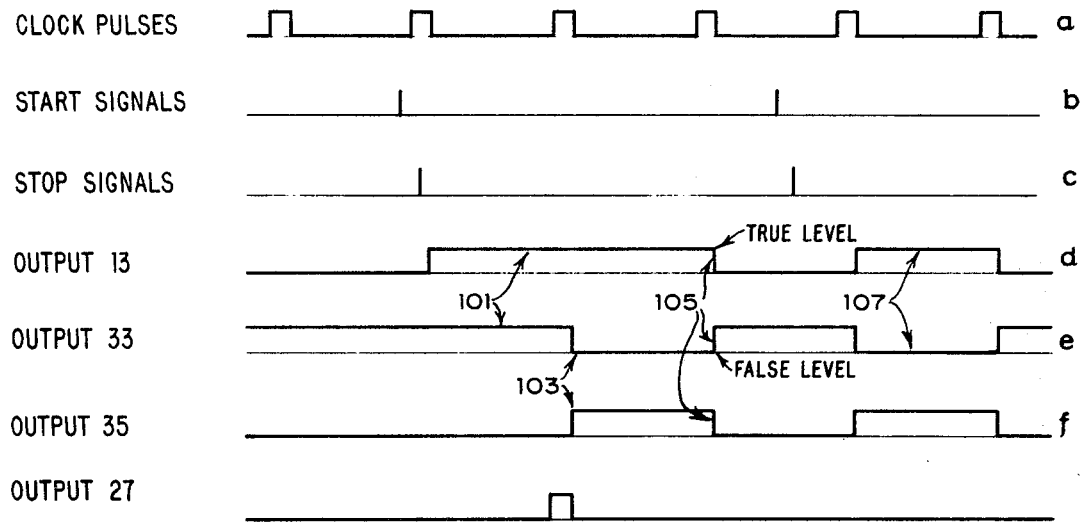
FIG. 2a-g are graphs showing typical waveforms produced by the apparatus in FIG. 1.

For any time interval whose start signal sets flip-flop 19 prior to the leading edge of a clock pulse appearing at clock input 17 and whose stop signal sets flip-flop 37 after the leading edge of the same clock pulse appears at clock input 43, outputs 13 and 33 of start means 23 and stop means 45 respectively will be at similar true levels 101 simultaneous with the trailing edge of that clock pulse, as shown in FIGS. 2d and 2e. These outputs will remain in this condition until a stop signal sets flip-flop 37 prior to the leading edge of a clock pulse appearing at clock input 43. The example in FIG. 2 shows such a stop signal occurring shortly after the leading edge of a clock signal. Upon the trailing edge 103 of the next clock signal output 33 switches to a false level and output 35 switches to a true level as shown in FIGS. 2e and 2f.

For any time interval whose start and stop signals set flip-flops 19 and 37 respectively prior to the leading edge of a clock signal appearing at their clock inputs, outputs 13 and 33 will be at dissimilar levels 107 as shown in FIGS. 2d and 2e.

Output 35 is connected to reset inputs 15 and 41 of start and stop control means 23 and 45 respectively, and is used to reset the start and stop control means upon the trailing edge 105 of the clock pulse that occurs after output 33 is switched to a false level as shown in FIGS. 2d, 2e and 2f.

Clock gating means 29 has a clock input C connected to the clock means 25. Inputs A and B are connected to outputs 13 and 33 of start and stop control means 23 and 45 respectively. Clock gating means 29 is enabled by a true level output from start control means 23. Start control means 23 assures that the true level output never occurs during a clock pulse. The initial state of output 33 of stop control means 45 is a true level as shown in FIG. 2e, and therefore clock pulses appearing at clock input C are allowed to pass through the clock gating means when a true level output appears at input A of the clock gating means. Clock gating means 29 is disabled in response to a false level at input B from output 33 of stop control means 45. The stop control means 45 assures that the false level output will occur only after a number of complete clock pulses has passed through the clock gating means, as represented in FIG. 2g.

Output 35 of stop control means 45 is connected to input 51 of averaging means 63. Input 51 is connected to the input of a conventional decade divider assembly 55 which is responsive to the number of time intervals that have occurred and provides an output to binary flip-flop 57. Output Q of flip-flop 57 is connected to AND-gate 59 of averaging means 63 for enabling gate 59 during $10^N$ time intervals, where N is an integer that can be manually selected by conventional techniques. Output 27 of clock gating means 29 is connected to input 53 of averaging means 63 which is connected to an input of AND-gate 59. The output of this gate forms output 61 of averaging means 63 which is connected to display means 65.

Display means 65 is a conventional decade counting assembly that totalizes and displays the number of clock pulses passed by gate 59 during $10^N$ time intervals. The display means includes a decimal point indicator that is initially positioned in response to the number N selected. An increase in N by one causes the decimal point to be shifted one place to the left. A decrease in N by one causes the decimal point to be shifted one place to the right. In this way the requisite averaging is accomplished.

It should be noted that to make an average time interval measurement the repetition rate of the recurring start and stop signals must not be an exact multiple of a subharmonic of the clock rate from the clock means 25. This requirement assures that the recurring start and stop signals will not occur at the same point in time between clock pulses and therefore a highly accurate statistical average can be obtained.

Therefore, the present invention includes a circuit to measure the average time interval that occurs between recurring electrical signals. Only complete clock pulses are passed through the clock gate and therefore the measurement is independent of errors which would otherwise be introduced with conventional time interval measurement techniques.

What is claimed is:

1. Apparatus for measuring the average time interval that occurs between recurring start and stop signals, the apparatus comprising:

control means having start and stop inputs and having an output normally at a false level for producing a true level output in response to a start signal being applied at said start input and for returning to said false level output in response to a stop signal being applied at said stop input;

a source of periodic clock pulses;

clock gating means having a first input connected to said source of periodic clock pulses and a second input connected to said control means output and having an output responsive to a true level at said second input for passing clock pulses through said clock gating means during such time as the true level signal is maintained at said second input;

averaging means having an output and having an input A connected to the stop input of said control means and an input B connected to the output of said clock gating means for counting the number of stop signals that appear at input A and for passing through to said output such clock pulses that appear at input B between the first and the $10^N$ stop signal, where N is in integer;

means for selecting the number N of time intervals to be averaged; and means to count and display the output of said averaging means, said means including a decade counting assembly having a decimal point indicator responsive to the means for selecting the number N.

2. Apparatus as in claim 1 wherein said averaging means comprises:

main gating means having an input B connected to receive clock pulses from said clock gating means and an input C to control the time interval during which clock pulses will be allowed to pass through said main gating means and having an output; and counting means having an input A connected to receive signals that represent the occurrence of a time interval and having an output connected to said input C of said main gating means to enable said main gating means in response to a first time interval having occurred and to disable said main gating means in response to $10^N$ time intervals having occurred.

3. Apparatus as in claim 1 wherein:

said control means has a clock input connected to said source of periodic clock pulses for producing said true level output simultaneous with the trailing edge of a clock pulse appearing at said clock input in response to a signal appearing at said start input prior to the appearance of a clock pulse at said clock input and in the absence of a signal appearing at said stop input prior to the appearance of said clock pulse and for producing said false level output simultaneous with the trailing edge of a clock pulse that appears at said clock input after a signal has appeared at said stop input for gating through said clock gating means only complete clock pulses.

* * * * *